United States Patent
Clark et al.

(10) Patent No.: US 11,910,285 B2
(45) Date of Patent: *Feb. 20, 2024

(54) METHOD AND APPARATUS FOR SUPPORTING DYNAMIC RECONFIGURATION

(71) Applicant: AIRSLATE, INC., Brookline, MA (US)

(72) Inventors: Thorfinn Clark, Beverly Hills, CA (US); Dominic Tham, Saratoga, CA (US)

(73) Assignee: AIRSLATE, INC., Brookline, MA (US)

( * ) Notice: Subject to any disclaimer, the term of this patent is extended or adjusted under 35 U.S.C. 154(b) by 299 days.

This patent is subject to a terminal disclaimer.

(21) Appl. No.: 17/062,128

(22) Filed: Oct. 2, 2020

(65) Prior Publication Data

US 2021/0037362 A1 Feb. 4, 2021

Related U.S. Application Data

(63) Continuation of application No. 16/237,091, filed on Dec. 31, 2018, now Pat. No. 10,798,546, which is a
(Continued)

(51) Int. Cl.
| | |
|---|---|
| *H04L 12/18* | (2006.01) |
| *H04W 4/50* | (2018.01) |
| *H04L 51/04* | (2022.01) |
| *H04W 4/14* | (2009.01) |
| *H04L 67/10* | (2022.01) |
| *H04L 51/214* | (2022.01) |

(Continued)

(52) U.S. Cl.
CPC .......... *H04W 4/50* (2018.02); *H04L 12/1859* (2013.01); *H04L 51/04* (2013.01); *H04L 51/214* (2022.05); *H04L 67/01* (2022.05); *H04L 67/10* (2013.01); *H04L 67/55* (2022.05); *H04W 4/14* (2013.01)

(58) Field of Classification Search
CPC ........ H04W 4/14; H04W 4/50; H04W 12/08; H04W 12/06; H04L 67/10; H04L 67/26; H04L 67/42; H04L 51/14; H04L 12/1859; H04L 63/10; H04L 63/083; H04L 51/04
See application file for complete search history.

(56) References Cited

U.S. PATENT DOCUMENTS

| | | | |
|---|---|---|---|
| 9,251,114 B1 * | 2/2016 | Ancin | .................. H04L 63/08 |
| 2008/0043696 A1 * | 2/2008 | Yang | ................ G06F 21/6245 370/341 |

(Continued)

OTHER PUBLICATIONS

U.S. Appl. No. 15/172,051.

*Primary Examiner* — Khoi V Le
(74) *Attorney, Agent, or Firm* — DLA PIPER LLP (US)

(57) ABSTRACT

Disclosed are systems and methods for supporting dynamic reconfiguration. The systems and methods can include: pointing to a document server providing document services as a primary document server; dynamically reconfigure and point itself to use a document appliance indicated by an electronic invite received by the first computing device from a second computing device; and enable the first computing device to pass data or information received in the electronic invite to the document application in response to the first client.

17 Claims, 2 Drawing Sheets

Related U.S. Application Data continuation of application No. 15/172,051, filed on Jun. 2, 2016, now Pat. No. 10,212,562.

(60) Provisional application No. 62/170,611, filed on Jun. 3, 2015.

(51) Int. Cl.
*H04L 67/01* (2022.01)
*H04L 67/55* (2022.01)

(56) References Cited

U.S. PATENT DOCUMENTS

| | | | | |
|---|---|---|---|---|
| 2013/0268999 A1* | 10/2013 | Kiang | ................ | H04L 67/1095 |
| | | | | 726/4 |
| 2014/0108793 A1* | 4/2014 | Barton | ................ | G06F 21/6218 |
| | | | | 713/165 |
| 2014/0165176 A1* | 6/2014 | Ow | ..................... | H04L 65/403 |
| | | | | 726/8 |
| 2015/0067811 A1* | 3/2015 | Agnew | .............. | H04L 63/0281 |
| | | | | 726/9 |

\* cited by examiner

METHOD AND APPARATUS FOR SUPPORTING DYNAMIC RECONFIGURATION

CROSS-REFERENCE TO RELATED APPLICATIONS

This application is a continuation application of U.S. application Ser. No. 16/237,091 filed Dec. 31, 2018, which is a continuation application to application Ser. No. 15/172,051, filed on Jun. 2, 2016, now U.S. Pat. No. 10,212,562, issued on Feb. 19, 2019, which claims the benefit of U.S. Provisional Patent Application No. 62/170,611, filed Jun. 3, 2015, and entitled "Dynamically reconfigure mobile devices from primary to secondary services based on pushed data". The entireties of these applications are herein incorporated by reference.

BACKGROUND

Cloud-based document service, e.g., secured signature service such as CudaSign, was first built as a multi-tenant Software as a Service (SaaS) solution hosted at a cloud-based third party data center such as Amazon Web Services (AWS). Such cloud-based document service is accessible directly by multiple tenants/users/clients including but not limited to Web clients, native iOS clients, native Android clients, and customers and integration apps via one or more Application Programming Interfaces (APIs) at a single hostname/address. The clients may perform various operations/activities such as provisioning their accounts, viewing status on all of their existing documents, posting documents, creating invites, viewing status of outstanding invites, signing document(s) in the invites, and completing document structures via the APIs. The APIs ensure that when an invite to sign a document is generated by a client via a web browser and sent to another client invitee for signature via an email, the invite would present the correct document and status on a mobile phone associated with the invitee.

A stand-alone hardware document appliance for document services, such as CudaSign Appliance, can be launched as a complete stand-alone (secondary) signature solution by the same document service provider, wherein the stand-alone document appliance may be used by customers to store and manage their documents in an environment under their control. The document appliance provides the same set of general document-related functionalities and APIs as the primary multi-tenant cloud based document service. Since an invite generated via a document appliance can be sent to any email address or user in the world, the recipient of the invite (the invitee) may fail when attempting to respond using the native app of his/her own mobile device upon receiving the invite because the app was configured to use the primary cloud-based document service of the client, not the document appliance from which the invite is sent. Requiring the invitee to use custom apps build specifically for each document appliance and to choose the app depending on which document appliance has been used to send the invite would be unwieldy and confusing.

The foregoing examples of the related art and limitations related there with are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
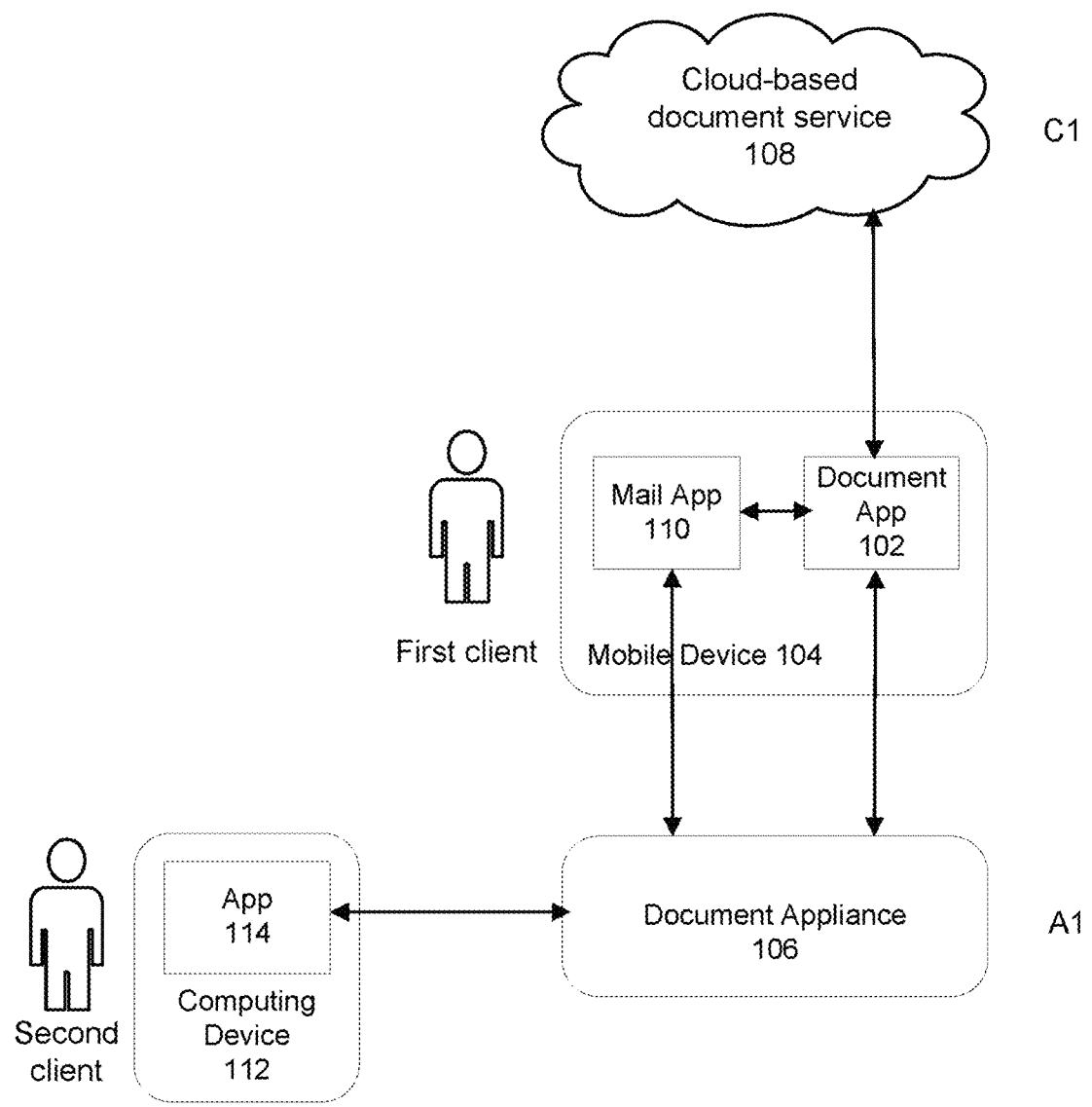
FIG. 1 depicts an example of a system diagram to support dynamic reconfiguration of document devices in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support automated dynamic reconfiguration of a mobile device of a client from using a primary document service to a secondary document service by the same service provider based on pushed data received via the mobile device. Specifically, when the client logs in to his/her account at the primary cloud-based document service by default and later receives an invite sent by another client via the secondary document appliance, a document app on the client's mobile device would automatically reconfigure itself to use the secondary document appliance for a specific set of operations on a document as required by the invite instead. The client may then access the secondary document appliance to view the document, sign it, and complete the entire process within the document app. Following the client's completion of accessing the document via the operations, the document app is automatically reconfigured back to use its primary cloud-based document service.

Under the proposed approach, a client is enabled to view and respond to an invite sent by another client via a document appliance anywhere in the world using a document app on his/her mobile device while logging to a cloud-based document service at the same time. This provides the client with efficient and instant access to the document service via a mobile device regardless how an invite to access the document service is generated and provided to the mobile device (either via a cloud based document service or a dedicated document appliance). The dynamic configuration of the primary and/or the secondary document service to be used by the client is made transparent to the client during the entire process the document service is being accessed.

FIG. 1 depicts an example of a system diagram 100 to support dynamic reconfiguration of document devices. Although the diagrams depict components as functionally separate, such depiction is merely for illustrative purposes.

It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes a document access application/app 102 running on a mobile device 104, a hardware document appliance 106, and a multi-tenant cloud-based document service provider/server 108. Here, the mobile device 104 can be but is not limited to a mobile phone (e.g., a smartphone) or a tablet such as an iPhone, an iPad, a Google's Android device, a laptop PC, or any mobile computing and/or communication device capable of running a software component or app. The hardware document appliance 106 is hardware computing, communication, and/or storage device configured to provide access to documents stored either locally or remotely in the cloud. Both the document appliance 106 and the cloud-based document server 108 may each include a computing unit and software instructions that are stored in a storage unit such as a non-volatile memory (also referred to as secondary memory) of the computing unit for practicing one or more processes. When the software instructions are executed, at least a subset of the software instructions is loaded into memory (also referred to as primary memory) by the computing unit, the computing unit becomes a special purpose for practicing the processes. The processes may also be at least partially embodied in the computing unit into which computer program code is loaded and/or executed, such that, the computing unit becomes a special purpose computing unit for practicing the processes. When implemented on a general-purpose computing unit, the computer program code segments configure the computing unit to create specific logic circuits.

In the example of FIG. 1, components of system 100 are configured to communicate with each other following certain communication protocols, such as TCP/IP protocol, over one or more communication networks. Here, the communication networks can be but are not limited to, Internet, intranet, wide area network (WAN), local area network (LAN), wireless network, Bluetooth, WiFi, and mobile communication network. The physical connections of the network and the communication protocols are well known to those of skill in the art. The forms of information being communicated among the various parties listed above over the communication networks includes but is not limited to, emails, messages, web pages with optionally embedded objects (e.g., links to approve or deny the request).

In the example of FIG. 1, types of configurations of the document servers/appliances can be but are not limited to: One is a multi-tenant document server 108 in a public cloud and designated as the primary document service provider/server, while one or more are document appliances 106 in a private cloud or local to the premise of their clients.
Same as above but with one of the document appliances 106 in the private cloud designated as the primary.
All are on two or more private document appliances 106 with one of them designated as the primary.
All are document servers 108 in one or more public clouds with one of them designated as the primary.

In the example of FIG. 1, the document app 102 running on the mobile device 104 is by default configured to point to and utilize a cloud-based document service provided by document server 108 in the cloud for all of its document storage and access operations. The document app 102 is configured to enable a first client of the mobile device 104 to access and perform various operations to the documents maintained by the cloud-based document server 108 via the document app 102. Here, the document-related operations include but are not limited to create, open/read, view status, modify, delete, move, post, and sign the documents.

In the example of FIG. 1, a software application/app 114 running on a computing device 112 is configured to enable a second client associated with the computing device to provide information/data to be pushed to the mobile device 104 of the first client via a secondary document appliance 106. In some embodiments, the secondary document appliance 106 creates and sends an invite that includes the data pushed from the computing device 112 to the mobile device 104, either immediately upon receiving the pushed data from the computing device 112 or at a future time. Here, the invite can be but is not limited to an email, a short message service (SMS), an iOS notification, a chat or any other form of electronic message that includes the data to be pushed to the mobile device 104 of the first client. In some alternative embodiments, the app 114 is configured to create and send the invite to the mobile device 104 directly.

Here, the computing device 112 can be but is not limited to a laptop PC, a desktop PC, a mobile device such as an iPhone, an iPad, or an Android device. In some embodiments, the app 114 can be a web-based application or a web browser. The pushed data contained in the invite identifies a specific document an invitee is invited to access, provides appropriate access rights for the invitee to that document, and identifies the source to be reconfigured/pointed to support operations to the document, wherein the source is one of the document appliance or servers, which in the case of FIG. 1, can be the secondary document appliance 106 (e.g., A1).

Once the invitee (e.g., the first client) associated with the mobile device 104 receives the email or message that includes the data pushed from the second client via, for example, a mail app 110 running on the mobile device 104, the invitee is enabled to invoke the document app 102 running on the mobile device 104 by clicking a link (or pressing a button or taking other similar action) included in the invite to pass data/information in the invite to the document app 102. Depending on its current state (e.g., the document server it connects to), the document app 102 is configured to automatically reconfigure itself to use the document appliance/server as indicated by the information in the invite for the specific set of document operations required by the invite. For example, since the document app 102 may point to the primary cloud-based document server 108 by default, it will need to redirect its document service provider from the document server 108 to the secondary document appliance 106 (e.g., A1) if A1 is the document appliance designated by the invite. The document app 102 then proceeds to perform the set of document operations required by the invite via the secondary document appliance 106 designated by the invite. Upon completion of the set of document operations, the document app 102 is configured to automatically reconfigure itself to revert to the primary service provided by the cloud-based document server 108.

In some embodiments, the document app 102 can be manually configured to designate/use either the document appliance 106 (e.g., A1) or the cloud-based multi-tenant document server 108 (e.g., C1) as its primary document service. In the case where the document app 102 is configured with the document appliance A1 as the primary service, an invite designating the cloud-based multi-tenant document server C1 for its document operations will be handled by the document app 102 as coming from a secondary document service.

In some embodiments, configuration/designation of which document server/appliance is the primary can be accomplished by one or more of the following:

Hard coding the IP address of the server in the document app 102;

Manually configuring the designation address of the server in the document app 102 at run time;

Selecting from a preset list of candidates for the primary server in the document app 102;

Reconfiguring the primary server based on information in pushed data received in an electronic form as discussed below.

In some embodiments, determining components and/or scope of a document operation/transaction that is using the secondary server include but are not limited to: Pre-defining and hard coding such information in the document app 102; Passing such information in via a push method along with information on the document server.

In some embodiments, the document app 102 is configured to authenticate its communication with the primary and/or the secondary document servers during primary server reconfiguration via the following steps:

the document server 106 or 108 pushes a unique token to the document app 102 via an email, SMS, or other form of electronic messaging, wherein this unique token is sent back by the document app 102 to the document server when the document app 102 makes a request to access the document server.

In addition to the unique token, a client may provide a unique password to the document server 106 or 108 via the document app 102 in a separate communication.

For a non-limiting example, a password is generated by the document server and sent via a SMS to a phone number associated with an account of the client, wherein the password is provided back to the document server when the client attempts to make a connection to the server via the document app 102.

For another non-limiting example, a password is generated by the initiator of the document access, e.g., sender of an invitation, saved on the document server using a one-way encryption, and provided verbally to the recipient of the invitation, which then provided it back.

For another non-limiting example, the client may provide a password previously associated with its account on a specific document server.

For another non-limiting example, biometrics of the client associated with the invited account (for touch id type of authentication) can be passed to a specific document server in a trusted fashion along with the invitation.

Other methods of two-step verification are also supported. In some embodiments, these token/password/passcode combination can be configured to support different scopes of access—allowing full access to the document server or access to only specific document, data, or actions on the server.

In some embodiments, the document app 102 is configured to enable the first client to prove that he/she has access to the email/invite associated with its account with the document service by clicking a customized link in the email when attempting access to the account. Additionally, the client may provide a unique password associated with the account he/she is trying to access and pass it to the document server 106 or 108 via the document app 102 in a separate communication as discussed above.

Figure 2:
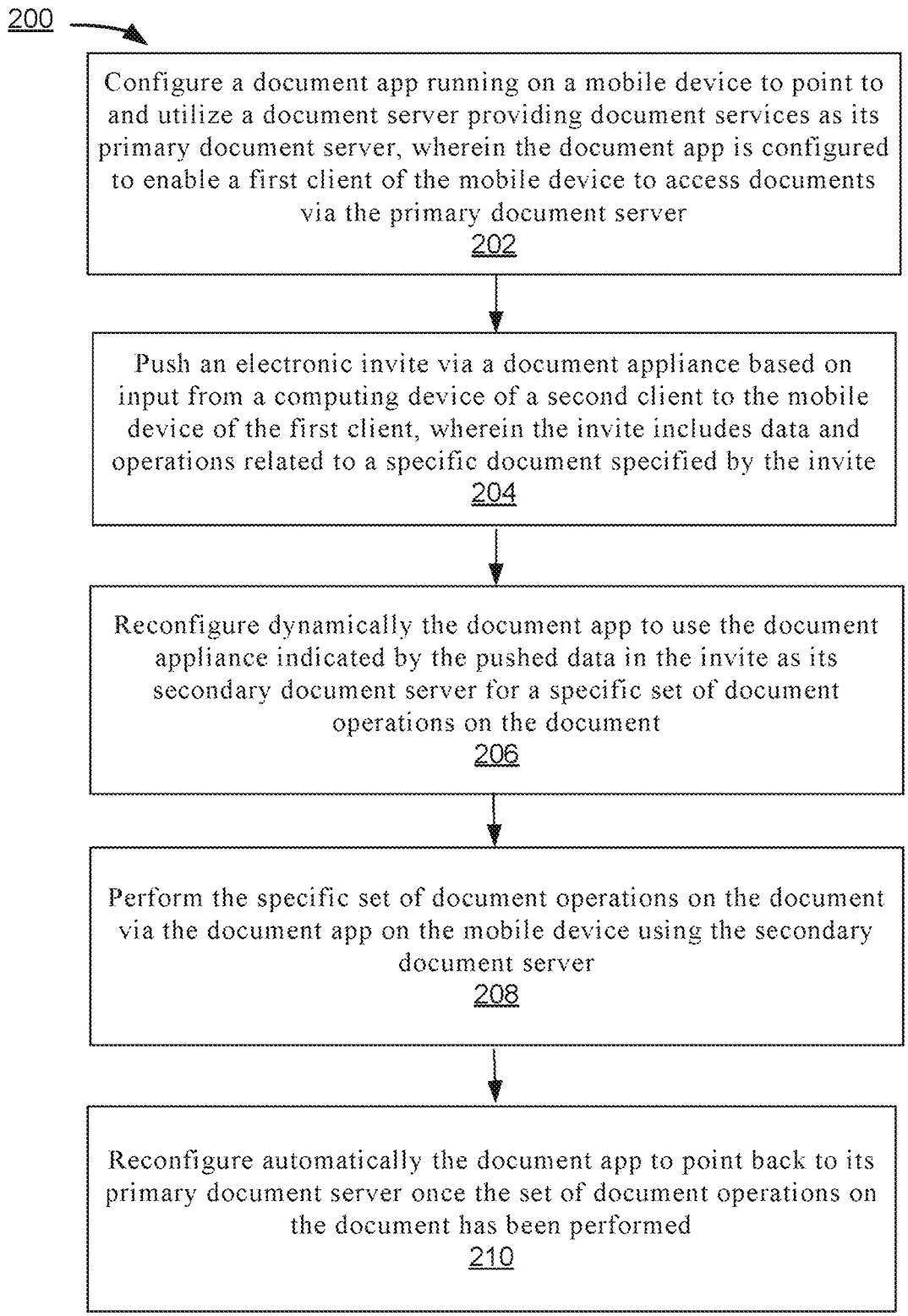
FIG. 2 depicts a flowchart of an example of a process to support dynamic reconfiguration of document devices in accordance with some embodiments.

FIG. 2 depicts a flowchart 200 of an example of a process to support dynamic reconfiguration of document devices. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a document app running on a mobile device is by default configured to point to and utilize a document service provided by a document server as its primary document server, wherein the document app is configured to enable a first client of the mobile device to access and perform various document operations via the primary document server. The flowchart 200 continues to block 204, where an electronic invite is sent via a document appliance based on input from a computing device of a second client to the mobile device of the first client, wherein the invite includes data and operations related to a specific document. The flowchart 200 continues to block 206, where the document app on the mobile device is dynamically reconfigured to use a document appliance/server indicated by the pushed data in the invite as its secondary document server for a specific set of document operations on the document as required by the invite. The flowchart 200 continues to block 208, where the first client is enabled to perform the specific set of document operations on the document via the secondary document server indicated by the invite via the document app on the mobile device. The flowchart 200 ends at block 210 where the document app on the mobile device is automatically reconfigured to point back to its primary document server once the set of document operations on the document has been performed.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A first computing device for supporting dynamic reconfiguration of a document application, comprising:
   a memory storing instructions; and
   a processor that, when executing the instructions, is configured to execute the document application, configured to:
      point to a document server providing document services as a primary document server, wherein the document application is configured to enable a first client of the first computing device to access documents via the primary document server;
      point to a document appliance indicated by an electronic invite received by the first computing device from a second computing device; and
      enable the first computing device to pass data or information received in the electronic invite to the document application in response to the first client clicking a link or pressing a button associated with the electronic invite,
      wherein the document application is further automatically reconfigured to point back to the primary document server once a specific set of document operations on the document has been performed by a secondary document server.

2. The first computing device of claim 1, wherein the document appliance is in a private cloud or local to a premise of the computing device and is configured to provide access to documents stored either locally or remotely in the cloud.

3. The first computing device of claim 1, wherein the electronic invite is an electronic message in a form of one of an email, a short message service (SMS), a notification, a chat or a form of the electronic message that includes data received by the computing device from the document appliance.

4. The first computing device of claim 1, wherein the electronic invite comprises data and operations related to a specific document, and wherein the data in the invite identifies one or more specific documents that the first client is invited to access, access rights of the first client to the document, and the document appliance to which the document application is to be reconfigured and pointed to support the operations to the document.

5. The first computing device of claim 1, wherein the document application is further configured to perform a set of document operations on a specific document includes performing, via one or more Application Programming Interfaces (APIs), one or more of creating, reading, viewing status, modifying, deleting, moving, posting, or signing the specific document within the document application.

6. The first computing device of claim 1, wherein the document appliance is configured to create and push the electronic invite to the first computing device over a network based on an input at the second computing device.

7. The first computing device of claim 1, wherein the document application is further configured to authenticate its communication with the primary document server or the document appliance via a unique password and a unique token, wherein different combinations of the token and password are configured to support different scopes of access to the document server.

8. The first computing device of claim 7, wherein the document application is configured to enable the first client to prove access to the electronic invite by clicking the link in the electronic invite.

9. A computer-implemented method for supporting dynamic reconfiguration of a document application, comprising:
   configuring, by a processor, the document application to point to and utilize a document server providing document services as a primary document server, wherein the document application is configured to enable a first client of a first computing device to access documents via the primary document server;
   pointing, by the processor, the document application to use a document appliance indicated by an electronic invite received by the first computing device from a second computing device;
   configuring, by the processor, the document application to enable the first computing device to pass data or information received in the electronic invite to the document application in response to the first client clicking a link or pressing a button associated with the electronic invite; and
   automatically reconfiguring and pointing, by the processor, the document application back to the primary document server once a specific set of document operations on the document has been performed by a secondary document server.

10. The computer-implemented method of claim 9, wherein the document appliance is provided in a private cloud or local to a premise of the first computing device.

11. The computer-implemented method of claim 9, wherein the electronic invite is an electronic message in a form of one of an email, a short message service (SMS), an iOS notification, a chat or a form of the electronic message that includes data to be pushed to the computing device via the document appliance.

12. The computer-implemented method of claim 9, wherein the electronic invite comprises data and operations related to a specific document, and wherein pushed data in the electronic invite identifies one or more specific documents that the first client is invited to access, access rights of the first client to the document, and a secondary document server to which the document application is to be reconfigured and pointed to support the operations to the document.

13. The computer-implemented method of claim 9, further comprising performing a set of document operations on a specific document includes performing, via one or more Application Programming Interfaces (APIs), one or more of creating, reading, viewing status, modifying, deleting, moving, posting, or signing the specific document within the document application.

14. The computer-implemented method of claim 9, wherein the document appliance is configured to create and push the electronic invite to the first computing device over a network based on an input at the second computing device.

15. The computer-implemented method of claim 9, wherein the document application is further configured to authenticate its communication with the primary document server or the document appliance during reconfiguration via a unique password and a unique token, wherein different combinations of the token and password are configured to support different scopes of access to the document server.

16. The computer-implemented method of claim 9, wherein the document application is configured to enable the first client to prove access to the electronic invite by clicking the link in the electronic invite.

17. A system for supporting dynamic reconfiguration of a document application, comprising:
- a first multi-tenant cloud-based document server configured to provide document services to a plurality of clients;
- a mobile device comprising a processor that executes the document application, the document application configured to:
    - point to and utilize the first multi-tenant cloud-based document server providing the document services as a primary document server, where the document application is configured to enable a first client of the mobile device to access documents via the primary document server;
    - point itself to a document appliance indicated by an electronic invite received by the mobile device from a computing device;
- enable the mobile device to pass data or information received in the electronic invite to the document application in response to the first client clicking a link or pressing a button associated with the electronic invite, wherein the document application is further automatically reconfigured to point back to its primary document server once a specific set of document operations on the document has been performed by the document appliance, and wherein the document appliance is configured to create and push the electronic invite to the mobile device over a network based on an input at the computing device.

\* \* \* \* \*